No. 795,581. PATENTED JULY 25, 1905.
W. S. & C. I. CORBY.
MACHINE FOR WORKING AND SHAPING DOUGH AND THE LIKE.
APPLICATION FILED FEB. 19, 1898.
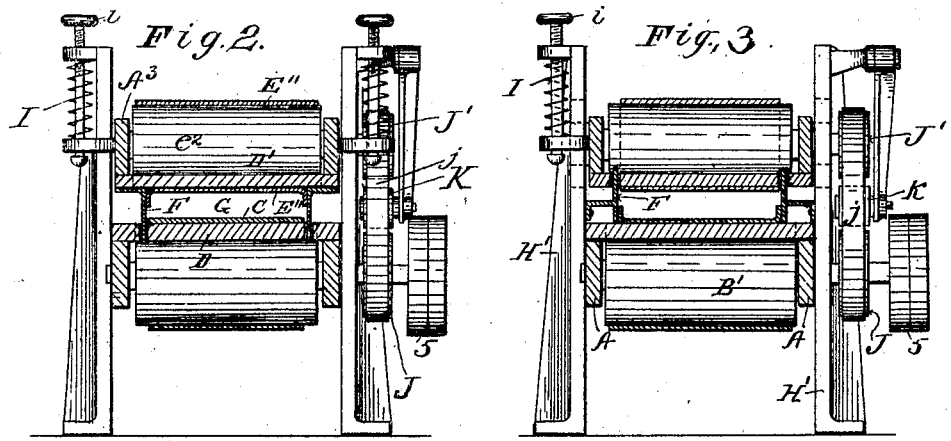
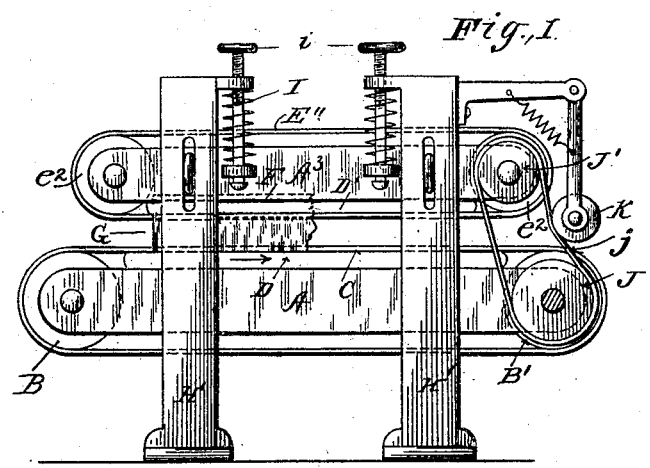
Witnesses,
W. R. Edelin.
Geo. T. May, Jr.
Inventors.
William S. Corby and
Charles I. Corby
By J. S. Barker Atty.

UNITED STATES PATENT OFFICE.

WILLIAM S. CORBY AND CHARLES I. CORBY, OF WASHINGTON, DISTRICT OF COLUMBIA, ASSIGNORS TO WARD-CORBY COMPANY, OF PITTSBURG, PENNSYLVANIA, A CORPORATION OF NEW JERSEY.

MACHINE FOR WORKING AND SHAPING DOUGH AND THE LIKE.

No. 795,581.  Specification of Letters Patent.  Patented July 25, 1905.

Application filed February 19, 1898. Serial No. 670,937.

*To all whom it may concern:*

Be it known that we, WILLIAM S. CORBY and CHARLES I. CORBY, citizens of the United States, residing at Washington, in the District of Columbia, have invented certain new and useful Improvements in Machines for Working and Shaping Dough and the Like and the Art of Treating Dough, of which the following is a specification.

Our invention has for its object to improve apparatus for working and shaping dough, and particularly for molding dough into loaves.

This invention belongs to that class of machines represented in our Patent No. 611,563, of September 27, 1898, to which patent reference is made for a description and illustration of many of the details of construction which we have omitted to show in this case, and our Patent No. 672,414, issued April 16, 1901, which latter patent is a division of this case.

The apparatus which constitutes the subject of the present invention is intended to operate upon masses of dough of uniform weight, which are usually delivered to the apparatus in the form of thin sheets. These sheets of dough are by the apparatus formed into compact masses properly shaped to form dough-loaves.

In order that the illustration of our present invention may be made as clear as possible, we have simplified such illustration, as far as it is practicable so to do, omitting from the drawings all parts and details which do not pertain directly to the improvements herein disclosed.

In the drawings, Figure 1 is a side elevation of an apparatus embodying certain features of our invention. Fig. 2 is a central vertical transverse section of the apparatus shown in Fig. 1. Fig. 3 is a similar view to Fig. 2, illustrating a somewhat different embodiment of certain parts of our invention.

A represents in a general way a stationary or rigid framework in which are mounted two rollers B B'. An endless belt C is supported on these rollers and travels between them, suitable driving mechanism (indicated by the pulleys 5) being connected with one of the rollers, turning it and through it imparting motion to the belt and the various movable parts of the apparatus.

D represents a support, which may be the top of the frame A and over which the belt passes in its movements between the rollers and which constitutes the support for the belt, holding it firmly in working position. This support is non-flexible—that is to say, while it may be as a whole either rigid or yielding it is practically non-flexible from end to end and from side to side, so that the belt will be caused to conform to the shape of the surface of the support during the dough-molding operation, and such shape is not changed by the position of the mass of dough, as would be the case were the support flexible. The belt C constitutes that part or member of the apparatus which operates to advance the masses of dough through the machine. In opposition to this dough-advancing member there is arranged a dough retarding or resisting device, which I shall herein term the "pressure member or device," since it operates, in conjunction with the belt and its support, to impart the necessary pressure to the dough mass while the latter is being molded into a dough-loaf. In the form of our invention represented in the figures now being described this pressure member consists of a movable belt $E''$, supported upon rollers $e^2$, which are mounted in a frame $A^3$. This frame is preferably yielding, being held in the proper position by springs I. Adjusting devices, such as the screws $i$, are combined with the springs in order to vary their effective tension. The movable belt $E''$ is arranged to travel across a support $D'$, which is preferably non-flexible.

The pressure member of the apparatus is arranged with its working face opposite to the working face of the belt C or advancing member of the device, so that between them there is a space G, which constitutes the working chamber or passage-way wherein the dough is molded, shaped, and worked.

We prefer that the belt $E''$ should be driven in the same direction as the belt C, so that their surfaces which are contiguous and which constitute the main opposite working surfaces of the dough-molding passage or chamber G move in opposite directions, the advancing working face of the member or belt C moving toward the discharge end of the machine, while the working face of the other belt moves toward the feed end.

In order that the material being operated upon shall be moved through the passage-way, it is necessary that one of the belts—the one C in the construction shown—should travel at a faster speed than the other, and to secure this we have shown a form of gearing consisting of a pulley J on the shaft of the belt-roller B' and a smaller pulley J' on the shaft of one of the belt-rollers $e^2$, these two pulleys being connected by a belt $j$. A yielding belt-tightener K keeps the belt taut under all working conditions and at the same time allows for the movement of the frame $A^3$ as a dough mass passes between the belts, which, as will be understood, causes a separation of the belts beyond their normal relations and a temporary enlargement of the passage-way G. The opposite movements of the two belts acting upon the opposite sides of the dough mass cause it to be coiled and to be rolled over and over and at the same time bodily advanced through the machine. The speed of the progressive movement of the dough mass is independent of the rapidity of rotation of the mass, the former depending upon the relatively greater speed of the advancing belt, while the rolling action depends upon the actual speed of the two belts. With this form of our invention a thorough working of the dough masses can be effected in a very short time.

In order to control the length of the dough-loaves formed and to shape the ends thereof, we provide means for closing the side edges of the molding passage-way or chamber G, with which the ends of the dough masses engage. These means consist of side walls (designated F) which are preferably perpendicular to the planes of the pressure and the resistance members of the apparatus. They may be variously arranged. In Figs. 1 and 2 the side walls F are represented as being secured to the support D' of the upper frame $A^3$. In this form the upper belt E" is represented as being wider than the belt C, and its side edges are turned down to lie parallel with and against the inner faces of the side walls F. It is evident, however, that the upper belt might be flat and the lower belt have its edges turned upward, as indicated in Fig. 3. The advantages incident to the edges of one of the belts being arranged at right angles to the working face thereof which is within the molding-chamber G is fully set forth in our aforesaid patent, No. 672,414, and and need not, therefore, be herein stated.

In Fig. 3 the side walls F of the working or molding chamber or passage-way are represented as being supported by the standards H' of the frame of the apparatus and quite independent of either of the belt-frames. It is also evident that these side walls might with propriety be secured directly to the support D, across which the advancing member or belt C moves.

It is evident that the machine constituting the subject of this invention is adapted to be used in combination with mechanism for forming the irregularly-shaped masses of dough into sheet form and also with mechanism for curling such sheets of dough preparatory to their being molded in the passage-way or chamber G; but as such devices form no part of our present invention they are entirely omitted in order that the features of novelty herein may be presented with the utmost simplicity and clearness. Reference, however, is made to our aforesaid patents for a showing of sheeting and curling mechanisms adapted to be used with the machine herein shown.

What we claim is—

1. In a machine adapted to work dough, the combination of two belts so mounted that their adjacent faces are relatively close together and are adapted to operate upon the opposite sides of a dough mass, a yielding frame in which one of the said belts is mounted, and means for driving the said belts simultaneously one at a faster speed than the other, substantially as set forth.

2. In a machine adapted to work dough, the combination of a supporting-frame, a belt C mounted therein and constituting the advancing member of the machine, another frame $A^3$ yieldingly supported above the said belt C, a belt E" mounted in said yielding frame, the last said belt and its yielding frame constituting the pressure member of the machine, means for driving the belts, the belt C at a faster speed than the belt E", and side walls arranged adjacent to the edges of the working portions of the said belts, substantially as set forth.

3. In a machine adapted to work dough, the combination of a supporting-frame, an endless belt mounted therein, another supporting-frame and a second endless belt mounted therein, one of the said frames being yielding relative to the other, springs for sustaining the yielding frame, belt-gearing arranged to connect the two belts, and a tightener for the belt-gearing, whereby one belt may be driven from the other, and the driving connection properly maintained as the relative positions of the belt-frames are changed, substantially as set forth.

WILLIAM S. CORBY.
CHARLES I. CORBY.

Witnesses:
J. T. BARKER,
GEO. T. MAY, Jr.